Figure 1:
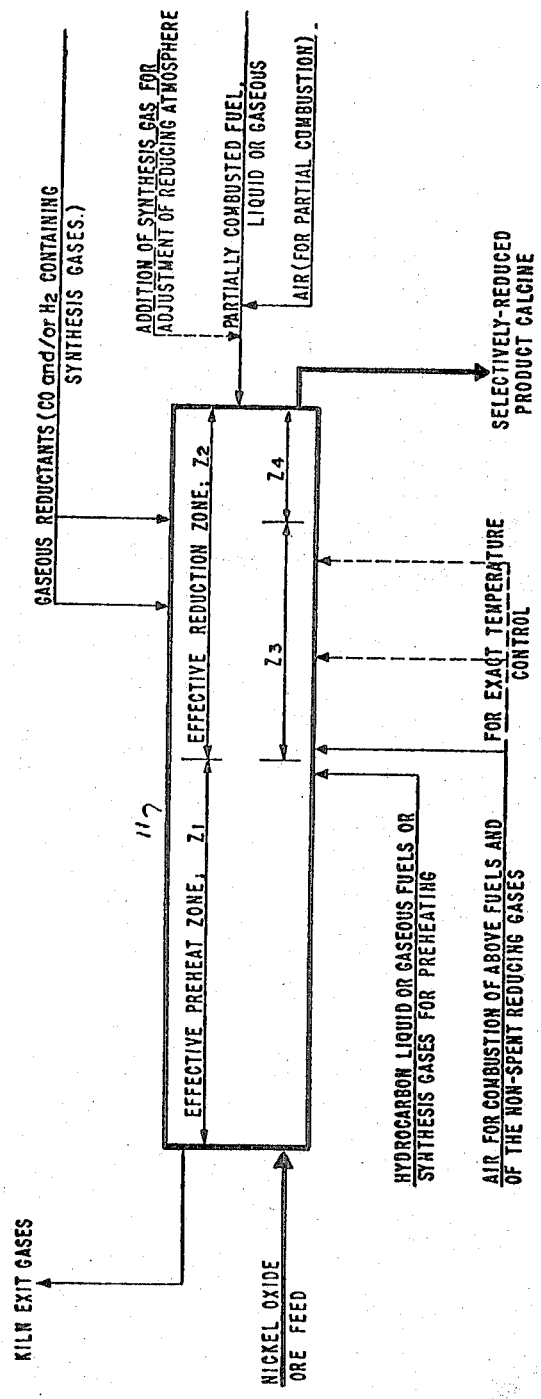

United States Patent
Curlook et al.

[15] 3,656,934
[45] Apr. 18, 1972

[54] ROTARY KILN REDUCTION OF LIMONITIC ORES

[72] Inventors: Walter Curlook, Neuilly, France; James Alexander Evert Bell, Port Colborne, Ontario, Canada

[73] Assignee: The International Nickel Company, Inc., New York, N.Y.

[22] Filed: Mar. 12, 1970

[21] Appl. No.: 18,890

[30] Foreign Application Priority Data

May 28, 1969 Canada..................047216

[52] U.S. Cl..........................75/82, 75/31, 75/21
[51] Int. Cl.........................C22b 23/02, C22b 5/18
[58] Field of Search.........................75/21, 31, 82

[56] References Cited

UNITED STATES PATENTS

| 2,473,795 | 6/1949 | Hills et al..................75/82 |
| 3,272,616 | 9/1966 | Queneau et al..................75/91 X |
| 3,185,464 | 5/1965 | Meyer et al..................75/34 X |
| 2,478,942 | 8/1949 | Queneau et al..................75/82 |
| 2,850,376 | 9/1958 | Queneau et al..................75/82 |
| 2,998,311 | 8/1961 | Illis et al..................75/82 |
| 3,503,735 | 3/1970 | Beggs et al..................75/82 X |
| 2,507,123 | 5/1950 | Sproule et al..................75/82 X |
| 2,994,601 | 8/1961 | Greene..................75/31 |
| 3,388,870 | 6/1968 | Thumm et al..................75/21 X |
| 3,390,979 | 7/1968 | Greene..................75/31 X |

*Primary Examiner*—Henry W. Tarring, II
*Attorney*—Maurice L. Pinel

[57] ABSTRACT

Directed to the reduction of nickel-containing lateritic ores in a rotary kiln at high production rates to achieve selective reduction of nickel contained in the ore wherein the ore is preheated to at least about 1,000° F. in a preheating zone in the kiln and is maintained at at least this temperature while it travels through the reduction zone and wherein within the reduction zone the preheated ore is first subjected to a strongly reducing atmosphere and is then subjected to a moderately reducing atmosphere adjacent the discharge end of the kiln.

5 Claims, 3 Drawing Figures

ROTARY KILN REDUCTION OF LIMONITIC ORES

The present invention is directed to a process for extracting metal values from the group consisting of nickel, cobalt and copper from oxide ores wherein the ores are first reduced in a rotary kiln operated under specially controlled conditions for the purpose of selectively reducing the metal value contained therein to render the same susceptible to extraction by subsequent operations.

The problem of extracting metal values from lateritic ores has confronted the art for many years. Ores of the lateritic type, including both limonitic ores and silicate ores, are not susceptible to concentration of metal values contained therein as is the case with sulfide ores. Consequently, all of the ore which is dug from the ground must be treated to condition the ore for extractive operations such as leaching, carbonyl treatment, etc., so as to recover the desired metal values therefrom.

Various methods have been proposed for treating lateritic ores of various types. For example, the Hills and Dufour U.S. Pat. No. 2,473,795 discloses a process for selectively reducing the nickel content of Cuban lateritic ores using a Herreschoff type furnace supplied with an atmosphere having a controlled composition with respect to the ratio of reducing to oxidizing constituents at each shelf in the furnace. According to the Hills et al. patent, recirculation of spent reducing gases is employed to modify and control atmosphere in the final reduction stages. Such a procedure is impractical in operating a rotary kiln, and is unnecessarily complicated.

M. H. Caron, in a paper titled "Ammonia Leaching of Nickel and Cobalt Ores" in Transactions of the AIME, Vol. 188, 1950, pp. 67–90, discusses the problem of recovering metal values such as nickel and cobalt from lateritic ores. Caron suggested that initial selective reduction of the ore could conveniently be done in a rotary kiln fired from the discharge end with incompletely combusted fuel such as coal or city gas. Under the Caron procedure for operating a rotary kiln, the ore would be subjected simultaneously to the highest reduction temperature and the richest reducing gas on discharge from the kiln, leading almost inevitably in practice to either overreduction or underreduction of iron contained in the ore. Also, because the appropriate reduction temperature should not be exceeded for fear of rendering the nickel inactive to subsequent treatment, the effective reduction zone, as determined by the temperature, exists for only a short length of kiln towards the discharge end resulting in low throughput capability. It is to be understood that the amount of iron which is coreduced in the reductive treatment of lateritic ores, particularly of the limonitic type, to reduce the metal value content can importantly and in many cases deleteriously affect subsequent treatment of the reduced ore to recover the desired metal value or values. Thus, iron reduced along with nickel will be dissolved by ammonia leach liquors and will precipitate as a flocculent iron hydroxide having a very slow settling rate. If the quantity of iron hydroxide is excessive, this creates difficulties in filtering and in losses of nickel and cobalt values which co-precipitate with the iron hydroxide precipitate. Furthermore, excessive production of metallic iron indicates excessive and unnecessary consumption of reducing reagents. Again, if vapometallurgical methods are employed for extracting the nickel, excessive iron in the reduced ore will hinder such extraction and will render subsequent purification and refining more difficult.

Because of the complexities involved in the treatment of nickel-containing lateritic ores so as to recover the metal values therefrom in an economical way, many problems remain.

Figure 2:
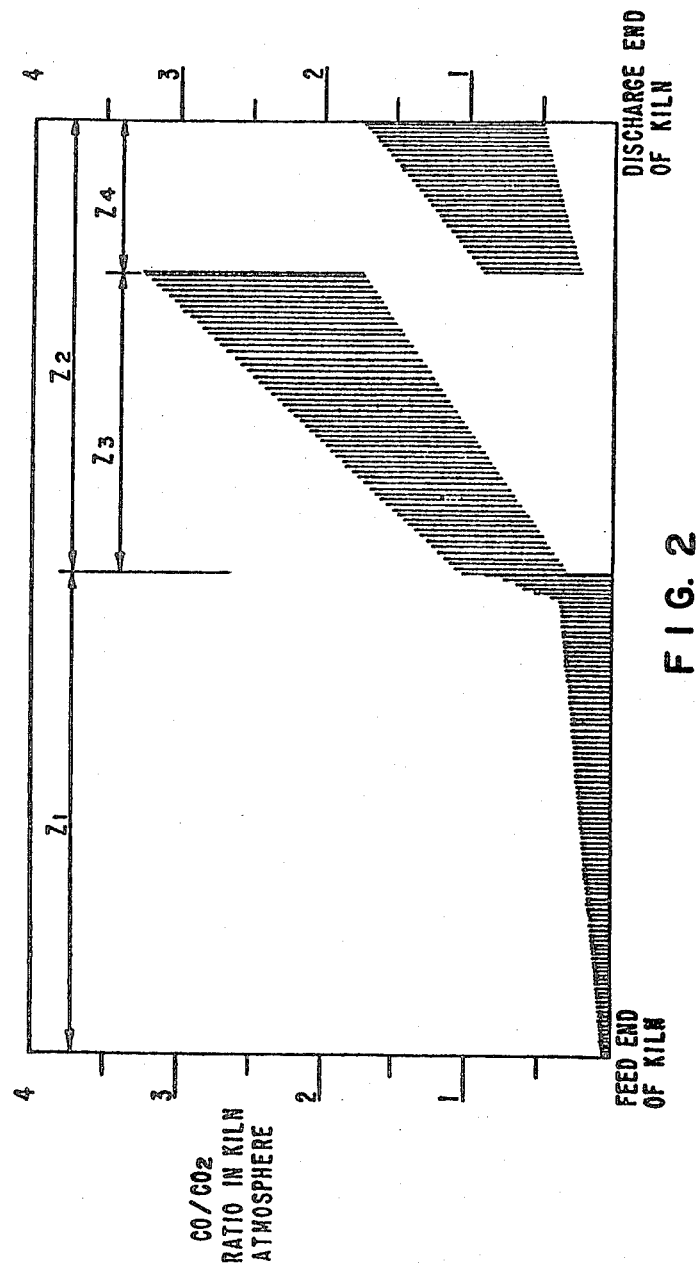
Figure 3:
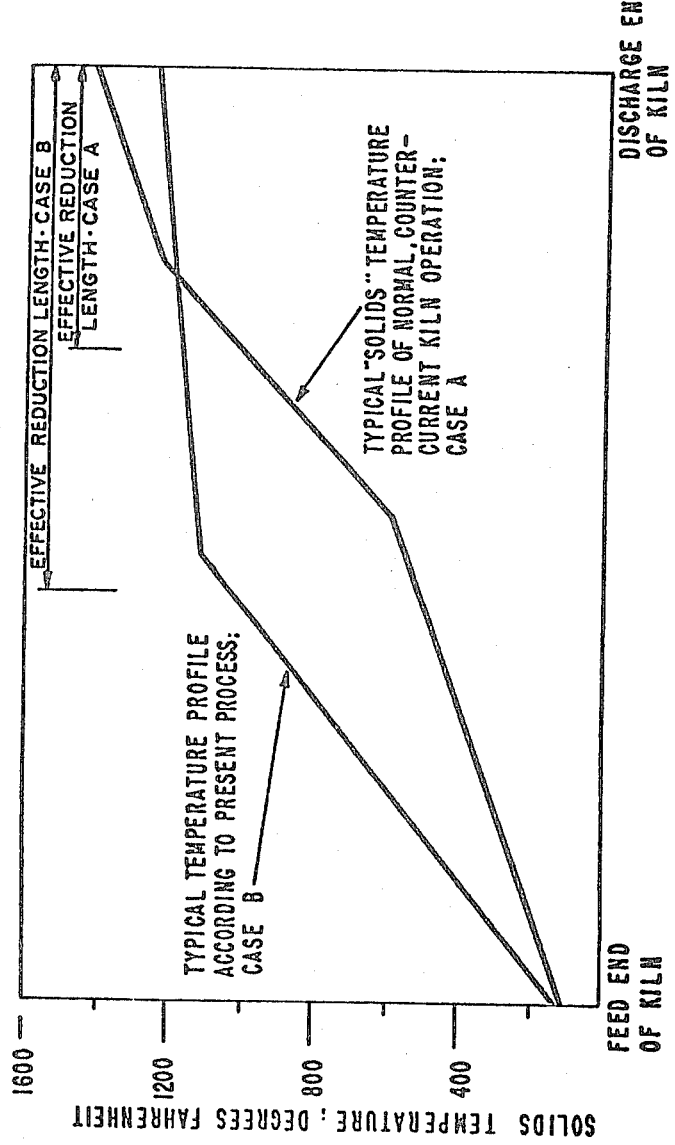

The present invention is directed to the solution of certain of these problems as will be made more apparent by the following description and by reference to the drawing in which FIG. 1 depicts, in outline, a rotary kiln especially adapted for the selective reduction of metal values contained in lateritic ores;

FIG. 2 depicts the atmosphere profile in the kiln during operation in terms of the ratio of reducing constituents, e.g., carbon monoxide and hydrogen to oxidizing constituents, e.g., carbon dioxide, water vapor, etc., in terms of the equivalent ratio of carbon monoxide to carbon dioxide in the kiln atmosphere; and FIG. 3 depicts as Case A the temperature profile in a rotary kiln operated in a standard manner with firing at the discharge end only, and depicts as Case B the temperature profile in a rotary kiln operated in accordance with the invention.

Generally speaking, the present invention is directed to the method for countercurrently operating a rotary kiln for reduction of lateritic ores containing at least one metal value from the group consisting of nickel, cobalt and copper wherein the sources of fuel for generating the reducing atmosphere and process heat are separated into a plurality of paths to produce in a portion of the reduction zone strongly reducing conditions by injection of rich reducing gases to yield in this portion of the reduction zone an atmosphere having a maximum reducing potential, equivalent to a $CO:CO_2$ ratio of at least about 1.5:1, preferably at least 2:1, and a temperature in the range of above about 1,000° F. and below about 1,400° F. by the combustion of a minor portion of the reducing gases or of other fuel in the said portion of the reducing zone and wherein in the portion of the reducing zone between the aforedescribed portion and the discharge end of the kiln a more moderate reduction potential is maintained such that the equivalent $CO:CO_2$ ratio therein is not greater than about 1.5:1, and is not less than about 0.5:1.

The concepts of the invention will now be described in relation to the drawing wherein, in FIG. 1 thereof, reference character 11 depicts, in outline, a rotary kiln having an inlet ore feed end and a reduced ore discharge end. The interior of the kiln is operated to provide a preheat zone indicated as Z1 and a reduction zone indicated as Z2. Within the reduction zone are maintained sub-zones Z3, in which the strongly reducing atmosphere is maintained, and Z4, in which the moderate reducing potential is maintained. In operation of the apparatus as depicted in the drawing, a lateritic ore having a fineness not exceeding about one-half inch and bearing a moisture content of less than about 5 percent is fed to the kiln. As the ore proceeds through the preheat zone of the furnace, it is preheated by the countercurrent flow of hot gas generated within the kiln from substantially atmospheric temperature to a temperature over about 1,000° F. whereby it is completely dehydrated. As the ore is fed into the kiln, it may include additions of powdered coal up to about 5 percent, by weight, representing a minor portion of the total fuel requirement, and of a sulfide such as pyrite in amounts to about 1 percent, by weight. The atmosphere in the preheat zone is maintained neutral or slightly reducing. As the preheated ore enters the reduction zone, it is subjected to much more strongly reducing conditions within the ore bed in order to accomplish the desired reduction of the metal values contained therein at a maximum rate of reduction and high throughput rate. In addition, further heat is supplied to the ore by means of combustion of minor quantities of fuel in the reduction zone or by combustion of a minor portion of the reducing gases in the kiln so as to achieve in the reduction zone an ore temperature of over about 1,000° F. but usually less than about 1,400° F., e.g., between about 1,100° F. and 1,350° F. Maintenance of the strong reducing potential in the ore bed within the reduction zone is accomplished by injection of rich reducing gases such as producer gas or water gas or equivalent or similar synthesis gases containing hydrogen and carbon monoxide as the main reductants although hydrogen and carbon monoxide themselves can be employed. Simultaneously, minor amounts of fuel are combusted in the kiln atmosphere by injection of air. Alternatively, mantle burners supplied with oil, producer gas, etc., as fuel and fired with air may be employed in place of direct combustion of the reducing gases inside the kiln. As the ore proceeds from the zone Z3 to the zone Z4, it is subjected to a slightly lower reducing potential so as to avoid overreduction of iron. This is accomplished by providing a gas with the desired reducing potential at the discharge end of the kiln.

This can be effected by partial combustion of hydrocarbon fuel or of a synthesis gas or by blending rich synthesis gases with lean products of combustion of fuels. The total amount of fuel introduced at the discharge end of the kiln could be up to 50 percent of the overall requirement. It is to be seen from the foregoing that the fuel and/or rich reducing gases which provide the atmosphere and heat supply to the kiln are divided into a plurality of streams countercurrent to the ore flow through the kiln to yield the special controls in respect of atmosphere composition and temperature within the kiln. A further substantial proportion of the total fuel required to meet the thermal input to the kiln may be combusted along the length of the kiln, with the greatest proportion of such fuel being combusted at the junction of the preheat and reduction zones of the kiln to supply heat for drying and preheating the ore feed in the preheat zone of the kiln. The fuel may be producer gas or crude oil and may represent about 25 percent to about 50 percent of the total thermal input to the kiln. The reducing gas supplied to the rich reduction zone of the kiln together with the reductants in the gases introduced at the discharge end of the kiln must be sufficient in quantity to effect the required degree of reduction. To ensure this in practice, an excess over the theoretical quantity must be employed with the result that a quantity of unused reductant passes on into the preheat zone for further combustion and use in preheating. The quantity of reducing gases thus supplied can be decreased if solid reducing agents are added to the feed.

By means of the process as described, lateritic ores of the type to which the invention is particularly directed and containing, on a dry basis, about 1 to 3 percent nickel, about 0.05 to 0.3 percent cobalt, with the iron oxide, magnesia and silica contents being dependent on the type of mineralization, is reduced such that essentially all of the nickel and cobalt are reduced, but only a small proportion of the iron is found in the metallic state. For example, with limonitic type of ore, containing 42 percent or iron, less than about 15 percent of the iron content will be reduced to the metallic state.

It is to be appreciated that the depth of ore being treated should be kept to a minimum in the preheat zone to facilitate drying and preheating of the ore. Lifters may be employed in the preheat zone to increase solid-gas contact. In the reduction zone, the depth of the bed may be increased to increase retention time in this zone, thereby optimizing the reduction process, by providing one or more circumferential dams at appropriate points.

By way of example, lateritic ores of the limonitic type containing between 38 percent and 46 percent iron and about 1.5 percent nickel were selectively reduced in a rotary kiln 50 feet in length and about 3 feet in diameter inside the brick lining in preparation for subsequent ammonia leaching. The reduction was effected countercurrently, in one case in standard fashion whereby all of the fuel and reductants were introduced at the discharge end of the kiln, and in another case according to the present invention. The typical temperature profile for both series of tests is depicted in FIG. 3. When operating in the standard fashion, extractions exceeding 80 percent of the nickel could only be achieved at feed rates below about 600 pounds per hour with a maximum extraction of 84 percent being obtained at a feed rate of about 400 pounds per hour. Control of the operation was difficult and extractions were erratic and usually under 80 percent. When operating according to the present invention, extractions of over 88 percent were readily achieved at feed rates over 800 pounds per hour, the operation was steady and the extractions were normally above 85 percent.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. In the countercurrent fuel fired rotary kiln process for selectively reducing metal values from the group consisting of nickel, cobalt and copper contained in a lateritic ore wherein ore fed to the rotary kiln is passed successively through a preheat zone and through a reduction zone, and reduced ore is discharged from said kiln, the improvement for maintaining within the reduction zone successive zones proceeding toward the discharge end of the kiln wherein the atmosphere is first maintained strongly reducing and then moderately reducing which comprises supplying the discharge end of the kiln with heat generated by burning a hydrocarbon fuel to supply up to about 50 percent of the total thermal input for the process and to generate an atmosphere having a maximum ratio of reducing to oxidizing gases equivalent to a $CO:CO_2$ ratio of 1.5:1 in said moderately reducing zone adjacent said discharge end, supplying through said kiln wall rich reducing gases to said strongly reducing zone, while combusting fuel in said strongly reducing zone to maintain in said zone an atmosphere wherein the ratio of reducing gases to oxidizing gases is equivalent to a $CO:CO_2$ ratio of at least about 1.5:1, while maintaining throughout said reduction zone a temperature of about 1,000° F. to about 1,400° F.

2. The process according to claim 1 wherein substantially the balance of the fuel required for process heat and atmosphere control is supplied through said kiln wall.

3. The process according to claim 1 wherein the temperature in said reduction zone is maintained within the range of about 1,100° F. and about 1,350° F.

4. The process according to claim 1 wherein the fuel supplied through said kiln wall is a synthesis gas.

5. The process according to claim 1 wherein the ratio of reducing to oxidizing gases in said strongly reducing zone is equivalent to a $CO:CO_2$ ratio of at least about 2:1.

* * * * *